United States Patent [19]

Melton

[11] Patent Number: 4,835,831

[45] Date of Patent: Jun. 6, 1989

[54] METHOD OF PROVIDING A REFRACTORY COVERING TO A FURNACE WALL

[76] Inventor: Sidney H. Melton, 804 Millwood Rd., Broken Arrow, Okla. 74011

[21] Appl. No.: 219,148

[22] Filed: Jul. 15, 1988

[51] Int. Cl.⁴ .............................................. B23P 19/04

[52] U.S. Cl. .................................... 29/460; 29/525.1; 52/506; 427/427

[58] Field of Search .................... 29/460, 525.1, 527.2; 52/506, 408, 509, 404, 743, 744, 515; 427/299, 427; 264/30

[56] References Cited

U.S. PATENT DOCUMENTS

| | | | |
|---|---|---|---|
| 2,365,629 | 12/1944 | Eckel | 52/506 X |
| 3,152,548 | 10/1964 | Schwartz | 52/506 X |
| 3,189,053 | 6/1965 | Parr | 29/460 |
| 3,587,198 | 6/1971 | Hensel | 29/460 X |
| 4,165,396 | 8/1979 | Calamari, Jr. | 427/427 X |
| 4,338,360 | 7/1982 | Cavanagh et al. | 427/427 X |
| 4,414,786 | 11/1983 | Frahme | 52/506 |
| 4,673,594 | 6/1987 | Smith | 427/427 X |

*Primary Examiner*—Timothy V. Eley
*Assistant Examiner*—Peter D. B. Vo
*Attorney, Agent, or Firm*—Head & Johnson

[57] ABSTRACT

A method of providing on a surface of a furnace a refractory covering including the steps of affixing to the surface of the furnace a fiber blanket layer formed such as mineral wool, fiber glass and ceramic fibers and then spraying on the blanket layer either pneumatically or hydraulically, a castable refractory, the fiber blanket absorbing the kinetic energy of the castable refractory causing an increased proportion of the sprayed material to adhere thereto, and permitting the refractory to harden into a continuous refractory covering.

11 Claims, 3 Drawing Sheets

METHOD OF PROVIDING A REFRACTORY COVERING TO A FURNACE WALL

SUMMARY OF THE INVENTION

Many types of furnaces have a steel inner wall which must be protected from the heat and chemical reactions of combustion and for this purpose a common expedient is to spray onto the wall a castable refractory material. The refractory material is sprayed either pneumatically or hydraulically with sufficient velocity to carry it from the gun applicator to the wall surface to cause the refractory to adhere to the wall surface. In order to properly compact the refractory, certain minimum velocity levels are normally required. One problem which is commonly encountered is that of the refractory rebounding from the surface rather than adhering to it. Obviously, the rebound effect would not be a serious problem on a floor surface, but it is a serious problem on a vertical or wall surface and even more of a problem on overhead or ceiling surfaces. In some applications, depending upon the characteristic of the steel surface, the specific type of castable refractory employed, the method of applying the refractory to the wall, the ambient temperature, the air velocity and so forth, a substantial percentage of the refractory initially applied to the wall will rebound, that is, will not adhere to the wall and will fall to the floor area of the furnace. This causes a great loss of efficiency of the application of castable materials to wall and ceiling surfaces and results in substantially increased expense. "Furnace" as used herein means any type of closure which is heated.

The present invention is directed towards a method and apparatus for improving the techniques of applying a castable refractory to a vertical or horizontal surface of a furnace. The method includes affixing to the wall or ceiling surface of the furnace a fiber blanket layer which is preferably affixed to the wall or ceiling surfaces in the form of batts of fiber material. Typically the batts are formed of mineral, glass or ceramic fibers or mixtures of them.

After the fiber blanket is affixed to the wall of the furnace, the castable material is then sprayed onto the blanket layer. This is done in the usual manner; that is, hydraulically or pneumatically and using either a wet or dry gun application. The blanket absorbs the kinetic energy of the castable material as it impacts the blanket covering the wall so that the kinetic energy is absorbed and the castable material adheres to the blanket and is thereby retained to the wall.

As the castable material builds up on the wall, the continuous impact of the castable refractory will cause the blanket to compress and the blanket itself becomes a better insulator as it compacts.

The blanket of insulation fibers may be affixed to the wall in a variety of ways, but the preferred embodiment includes the use of batts of fibers. One means of affixing the fiber blanket to the wall is by the use of adhesive applied to one surface of the blanket or to the wall, or to both, such as by the use of contact cement. Where adhesive is employed, the use of rolls of fibrous material may also be employed. In another, and a preferred method, metallic hook members, or refractory anchors, are secured to the wall such as by welding, which are then used to retain the fiber blanket to the wall. When refractory anchors are employed, the use of batts of fiber facilitates the step of securing the fiber blanket to the wall of the furnace as the individual batts may be properly positioned with respect to the refractory anchors so as to efficiently and effectively retain the blankets in position on the wall surface.

When the blanket is in the form of batts of fibrous material, the batts may be formed entirely of fibrous material in preselected shape and thickness, or the batts may be sewn or needled to help retain their shape. In another method, the fiber batts may have a covering of wire applied to at least one side, or the wire may completely encompass the batts. The wire may be of the type commonly referred to as chicken wire, or any open wire which can be impaled upon the refractory anchors. Refractory anchor clips may be employed to retain the blanket of fiber installation on a wall of ceiling surface.

A better understanding of the invention will be had by reference to the following description and claims taken in conjunction with the attached drawings.

DESCRIPTION OF THE DRAWINGS

FIG. 3 shows the embodiment wherein the fiber blanket includes a mesh wire covering.

DESCRIPTION OF THE PREFERRED EMBODIMENT

Figure 1:
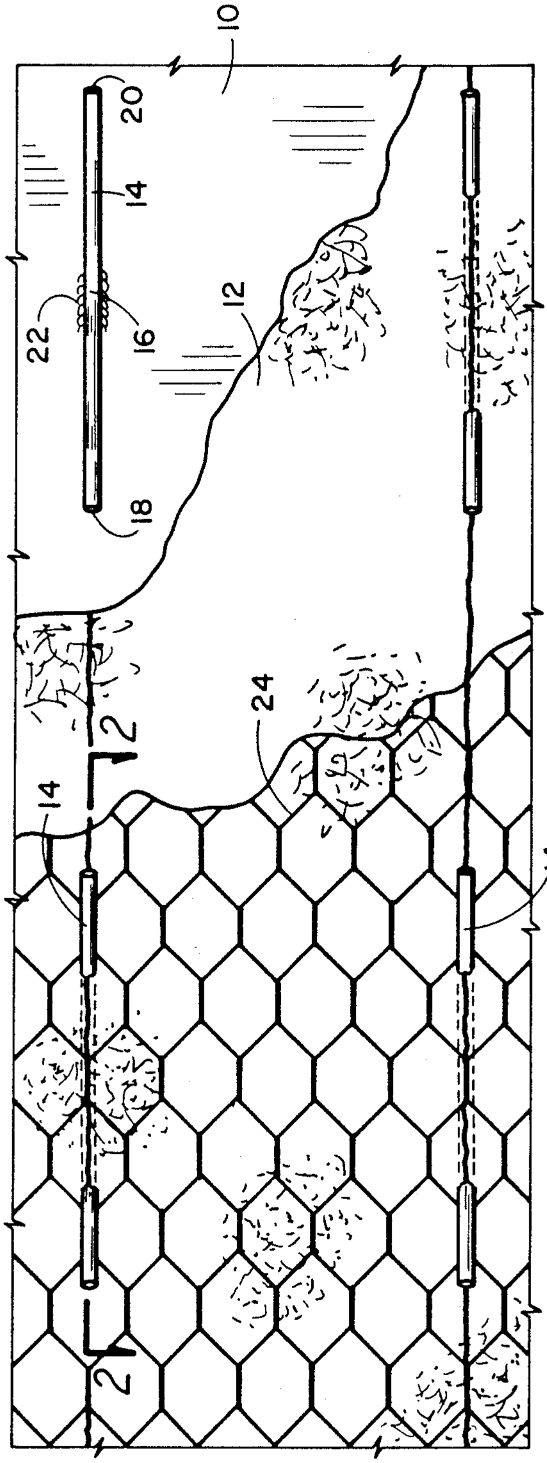
FIG. 1 is a fragmentary elevational view, shown broken away, and showing three of the steps employed in practicing the method of this invention; that is, showing at the upper right hand corner the exposed steel surface of a furnace with a refractory anchor attached; showing at the next level a blanket of fiber secured to the wall of the furnace and impaled upon the refractory anchor; and showing at the left hand portion of the figure the arrangement wherein the fiber blanket includes a wire mesh covering.
Figure 2:
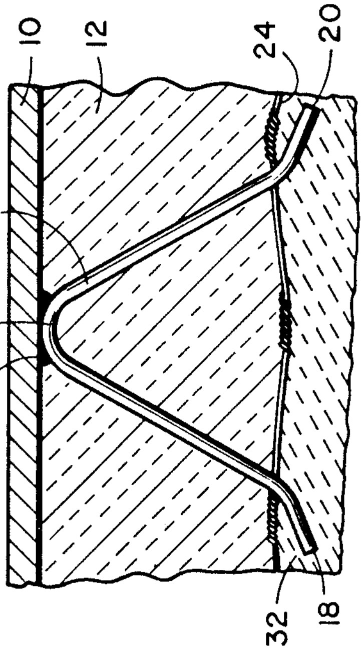
FIG. 2 is a partial cross-sectional view taken along the line 2—2 of FIG. 1 and showing a refractory anchor attached to the wall of a furnace with a fiber mat secured to the wall utilizing the refractory anchor and in which the fiber mat includes a covering of wire mess.
Figure 7:
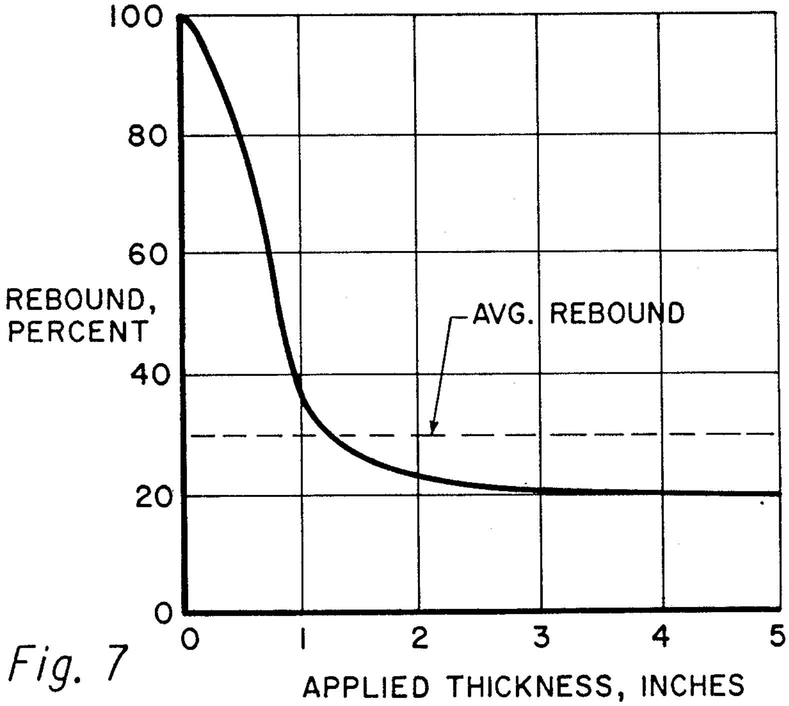
FIG. 7 is a graph showing the rebound effect of castable refractory material as applied directly to a smooth or plane steel wall of a furnace illustrating the loss of refractory due to rebound effect.

Referring to the drawings and first to FIG. 1 and 2, the method of this disclosure will be better understood. FIG. 1 is a partial elevational view of the interior of a furnace or other environment which is heated and which has a wall surface 10 formed of metal, such as steel. The wall surface 10 may be a vertical side wall, or a ceiling in a furnace or some similar area. The present commonly employed practice of covering the steel wall 10 with a castable refractory is to spray the castable refractory directly onto the wall 10. Spraying can be accomplished either by a wet or dry spray and either pneumatically or hydraulically. The castable material is directed by a spray gun towards the surface of wall 10. Upon impingement with a wall, such castable material tends to rebound; that is, be deflected off the wall. FIG. 7 is a diagrammatic illustration of the effect of applying a castable refractory directly to a wall by pneumatic or hydraulic means. When the castable refractory is first directed to the wall, a substantial amount bounces off the wall and falls to the floor of the furnace. As the refractory begins to build up and adhere to the wall the rebounding effect is diminished and finally a certain minimum percentage of refractory is rebounded so that the ultimate wall thickness can be obtained. FIG. 7 is not an empirically derived graph, but only emblematic of the fact that when castable refractory is sprayed on a wall initially a very high percentage does not adhere and as the refractory builds up a higher percent adheres. The purpose of this disclosure is to provide a means to substantially reduce the amount of rebound effect and reduce the amount of castable refractory which is lost in the application process.

To practice the invention a blanket of fiber 12 is affixed to the wall 10. The fiber may be such as formed of mineral, glass or ceramic material and is typically compacted into a blanket of approximately one-half to two inches thickness. The blanket 12 may be affixed to the wall 10 such as by the use of adhesive or bonding cement and the use of contact cement may be employed. However, the preferred arrangement is the use of metallic hook members 14 which are sometimes referred to as refractory anchors. The refractory anchor illustrated is of the bent wire type and best seen in FIG. 2. It is generally of V-shaped configuration with a bite portion 16 at the apex of the V-configuration and with ends 18 and 20. The refractory anchor 12 may be attached such as by screws; however, a preferred means is by welding at 22. The refractory anchors 12 are affixed to the wall 10 at spaced apart intervals, the spacing between the refractory anchors depending upon the nature of the castable refractory. In addition, typically the refractory anchors are spaced closer together on the ceiling than on the side walls so as to more securely hold the castable refractory.

Figure 6:
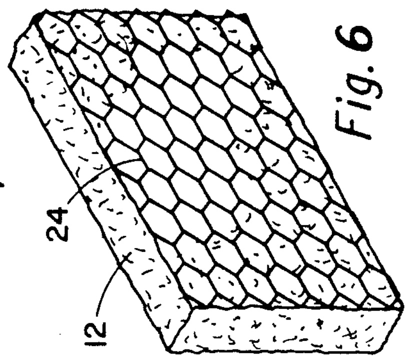
FIG. 6 is a reduced scale isometric view of a batt of fiber material with a mesh wire covering one surface.

The left hand portion of FIG. 1 shows the fiber blanket covered on the outer surface by a wire mesh 24 which can be formed such as of material most commonly used in the past as "chicken wire"; that is, a light gauge woven wire which is readily available and of economic construction. The wire mesh may be only on one side of the fiber blanket 12 such as illustrated in FIGS. 1, 2 and 6, or it may be on both sides of the fiber batt.

Figure 4:
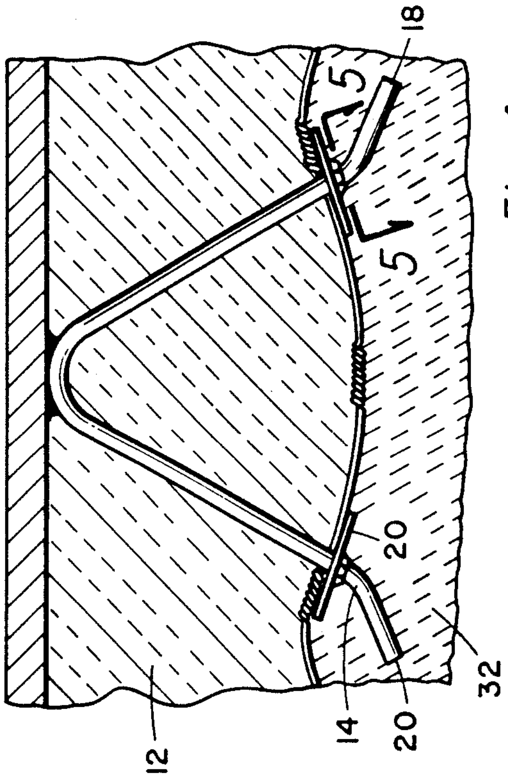
FIG. 4 is a cross-sectional view taken along the line 4—4 of FIG. 3 showing the use of the refractory anchor to retain the fiber blanket in contact with the wall and showing the use of clips to augment the retention of the fiber glass blanket.
Figure 5:
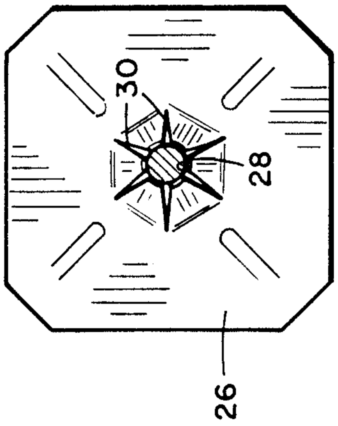
FIG. 5 is an enlarged elevational view of a clip affixed to a refractory anchor as taken along the line 5—5 of FIG. 4.
Figure 3:
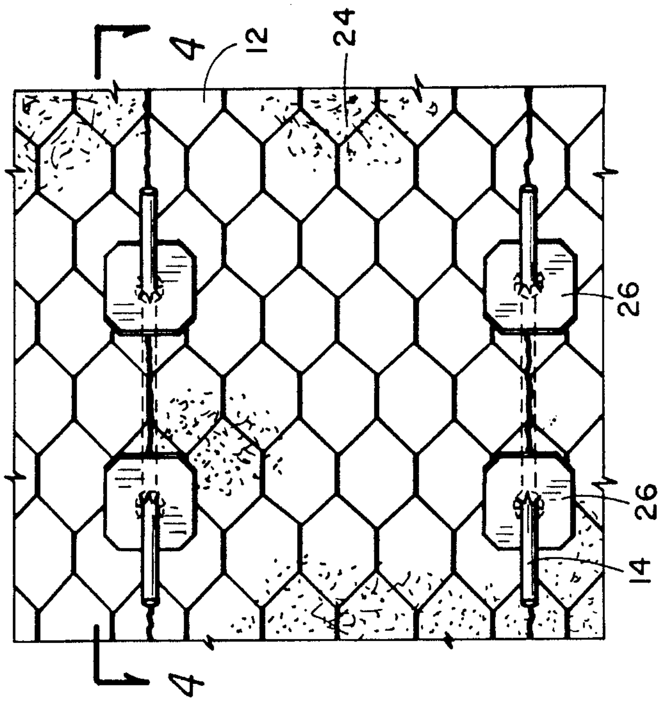
FIG. 3 is a partial elevational view as to FIG. 1 and showing the use of clips in conjunction with the refractory anchors to retain the fiber blanket in place on the furnace wall.
Figure 8:
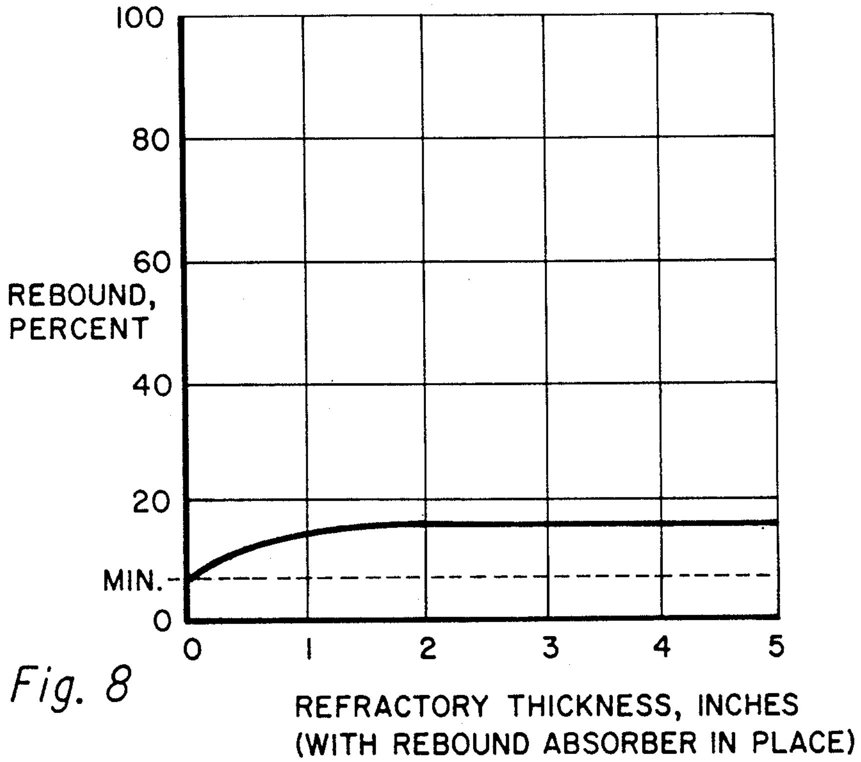
FIG. 8 is a graph showing the effect of the use of the method of this disclosure wherein a fiber blanket is first affixed to the wall before the castable refractory is applied showing the reduced rebounding effect.

In some instances, and particularly on ceilings, it is important that the fiber blanket be held securely; and for this reason, the use of clips 26 such as shown in FIGS. 3, 4 and 5 is beneficial. Each of the clips 26 is of thin metal, generally square, round or rectangular with an opening 28 in or near the center. Extending radially from the opening 28 are slits 30 in a star-shaped arrangement. The opening 28 is typically formed so that when the clip 26 is completely flat, the opening 28 is slightly smaller in diameter than that of the refractory anchor 14. To retain the fiber blanket 12 the blanket is first installed between rows of the refractory anchors 14, or in which the blanket is impaled over the refractory anchors, and then the clips 26 are forced into position by pushing the clips manually over the ends 18 and 20 of the refractory anchors so that the clips 26 are snug against the fiber blanket 12. In all instances it is important that the fiber batts be positioned against the steel surface. The clips are used to insure that the batts are pressed firmly against the outer surface.

Refractory anchors are normally employed in the application of castable refractory. In the practice of the method of this invention the refractory adheres to the blanket 12, but the anchors 14 retain the refractory to the surface.

While the use of wire mesh 24 is illustrated as being a preferred means of retaining the blanket of fiberglass on the wall 10, the use of the wire mesh is optional in that the blanket may be of the quilted or needled type, in which case the use of the wire mesh is not always necessary.

After the fiber blanket has been installed, with or without the wire mesh 24, and irrespective of the particular type of refractory anchor or other means by which it is secured to the wall 10, the application of a castable refractory can begin. The castable refractory is sprayed onto the exposed surface of the fiber blanket to form a layer of castable refractory 32, such as shown in FIGS. 2 and 4. The fiber blanket 12 absorbs the kinetic energy of the castable material as it is sprayed in towards the wall 10 so that a relatively small percent rebounds off the wall. In this manner the total amount of castable refractory required to provide a given level of insulation and/or thickness of refractory is reduced. This reduces not only the cost of the castable refractory, but the cost of clean up and the time involved in completing the spraying operation. The castable refractory may be applied several inches in thickness. The refractory anchor type and patterns are set by the person designing the castable refractory wall. In FIGS. 2 and 4 the castable refractory 32 is shown as being relatively thin compared to the fiber blanket 12; however, this is not pictorially descriptive of the typical finished wall since in practical application of the method the fiber blanket 12 may typically be only one half to two inches thick, whereas the castable refractory 32 may be up to five inches or more in thickness. After the initial castable refractory 32 has adhered to the fiber blanket, additional material may be sprayed onto the surface as necessary to build up the total desired depth.

The employment of the fiber blanket 12 helps disipate the impact energy of the refractory all through the gunning operation; that is, even after a relatively thick layer of castable refractory has been sprayed onto and adhered to a wall, less rebound is experienced as additional material is sprayed onto the wall. As the castable refractory is sprayed onto the wall the fiber blanket 12 will compact and such compaction results in increased insulation benefits derived from the fiber blanket.

The batts of material such as shown in FIG. 6, may typically be from three inches to twelve inches wide and sixteen inches to sixty inches long and from one-half to two inches thick, although the dimensions can be selected for the particular type of application being employed. The fiber blanket 12, as previously indicated, can be of ceramic fiber, mineral wool, fiber glass or similar material or a combination of such materials. The material, with or without wire 24, is still exceedingly pliable and can be easily curved to fit any desired shape or configuration which requires the application of a castable refractory.

In some instances it us desirable to set the surface of the fiber blanket with water before first applying the castable refractory. Saturating the blanket with water is not desirable.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of providing on a surface of a furnace a refractory covering, comprising the steps of:

affixing to a surface of a furnace individual batts of fiber blankets in substantially continuous placement to form a fiber blanket layer(,the fiber blankets being of material selected from the group comprising mineral wool, fiber glass and ceramic fibers, and mixtures thereof);

spraying onto the blanket layer a castable refractory; and permitting the refractory to harden into a continuous refractory covering.

2. The method according to claim 1 wherein said step of spraying onto the fiber blanket a layer of castable refractory includes spraying the castable refractory by one of hydraulic and pneumatic means.

3. The method according to claim 1 wherein said step of affixing a fiber blanket layer to a surface of a furnace includes affixing individual batts of fiber blankets, at least one surface of each batt of fiber blanket being covered by woven wire.

4. The method according to claim 1 including the steps of first attaching to the surface of a furnace a plurality of spaced apart metallic hook member and retaining the fiber blanket layer by use of the hook members.

5. The method according to claim 4 wherein the surface of the furnace to receive a refractory covering is metallic and wherein the step of attaching a plurality of hook members includes welding the hook members to the metallic surface.

6. The method according to claim 1 including the step of wetting the fiber blanket layer affixed to the wall of a furnace before the step of spraying onto the blanket layer a castable refractory.

7. The method according to claim 1 wherein said batts of fiber blankets are of material selected from the group comprising mineral wool, fiber glass and ceramic fibers, and mixtures thereof.

8. A method of providing on a metallic wall surface of a furnace a refractory covering comprising the steps of:

(a) attaching to the metallic wall a plurality of spaced apart metal hook members;

(b) securing to the metallic wall using the attached metal hook member, individual batts of fiber material selected from mineral wool, fiber glass and ceramic fibers and mixtures thereof, the individual batts being secured in substantially contiguous edge to edge relationship to provide a substantially continuous blanket covering of the wall;

(c) spraying onto the substantially continuous fiber blanket castable refractory; and (d) permitting the sprayed refractory to harden into a continuous wall covering.

9. The method according to claim 8 wherein the batts of fiber material are covered on at least one surface thereof by woven wire.

10. The method according to claim 8 of between steps (b) and (c) of wetting the blanket.

11. The method according to claim 10 wherein the step of wetting the blanket covering of the furnace wall includes the step of spraying the blanket with water.

* * * * *